United States Patent Office 3,344,724
Patented Oct. 3, 1967

3,344,724
FLASH CIRCUIT FOR PHOTOGRAPHIC CAMERAS
Tatsuya Taguchi, Tokyo, Japan, assignor to Canon Camera Kabushiki Kaisha, Ohta-ku, Tokyo, Japan, a corporation of Japan
Filed Oct. 5, 1964, Ser. No. 401,625
Claims priority, application Japan, Nov. 14, 1963, 38/85,596
2 Claims. (Cl. 95—10)

ABSTRACT OF THE DISCLOSURE

A flash circuit in which the flash bulb and a variable resistor are series connected in parallel across a photoconductive cell, the resistor being varied by the focussing of the objective lens of a camera so that when the flash bulb is inserted in its socket, the proper exposure value according to the camera distance can be obtained.

---

Figure 1:
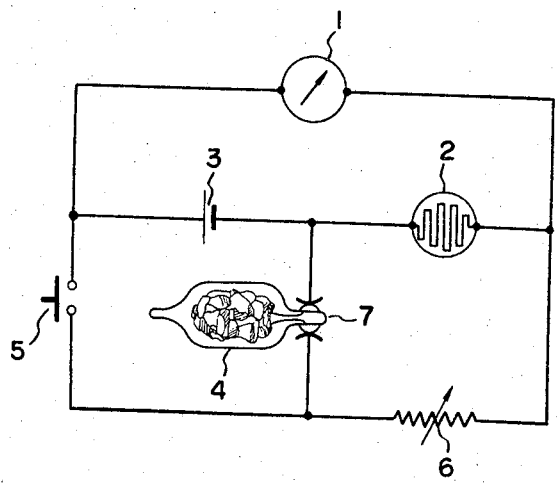

The present invention relates to a flash circuit for photographic cameras in which the galvanometer of the exposure meter also plays the part of another meter indicating the proper exposure value for flash photography.

Formerly, bothersome calculation was required to obtain the proper exposure values for flash photographs.

One of the objects of this invention is to provide a flash circuit for photographic cameras, in which the proper exposure values for flash photographs can be easily obtained, if the guide number of a flash bulb is pre-set, by means of the galvanometer of the exposure meter automatically indicating the proper exposure value corresponding to the distance from the object to be photographed merely by the insertion of a flash bulb, so that the flash operation can be carried out quite easily and rapidly.

Another object of this invention is to provide a flash circuit for photographic cameras in which the galvanometer of the exposure meter indicates the proper exposure values for flash photography. Still another object of this invention is to provide a flash circuit for photographic camera in which the flash bulb is flashed by the electric source of the exposure meter circuit.

A further object of this invention is to provide a flash circuit for photographic cameras in which the galvanometer of the exposure meter indicates the proper exposure value for flash photography and, additionally another electric source for flashing flash bulb is inserted in such circuit.

Figure 2:
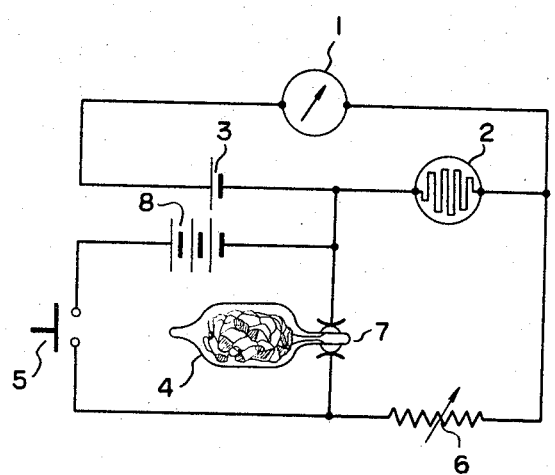

Other objects, advantages and features of this invention will become more apparent from the following description of an illustrative embodiment when read in conjunction with the drawing in which:

FIG. 1 illustrates an embodiment of the electric circuit according to this invention in which a source of the exposure circuit also serves as a source for flash bulb; and FIG. 2 illustrates another embodiment of the electric circuit according to this invention in which another source for flash bulb is inserted.

In the illustrative embodiment of FIG. 1 galvanometer 1 is connected to photoconductive cell 2 and potential source 3 for the exposure meter circuit. Flash bulb 4 is in series with the flash contacts 5 of the camera, and variable resistor 6, which cooperates with the objective focusing device of the camera so that the resistance of the resistor varies in accordance with camera distance from the scene to be photographed to the camera. When there is no flash bulb inserted in socket 7 the circuit is open here.

In this circuit with no flash bulb inserted in socket 7, galvanometer 1, cell 2, and potential source 3 constitute a well-known exposure meter circuit, with the galvanometer indicating the proper exposure value in accordance with the scene brightness impinging upon photoconductive cell 2. If both or either of the exposure factors of the diaphragm and shutter time are given to the circuits in the form of an electric resistance varying according to such factor or factors, then an appropriate exposure can be made by adjusting the pointer of the exposure meter to coincide with the position of the index on the meter. Thus when the scene brightness decreases to increase the resistance value of photoconductive cell 2, the deflection of the galvanometer is diminished to show the lack of scene brightness. And if flash bulb 4 is inserted in socket 7, the circuit is electrically closed at socket 7 by the filament of bulb 4 and the circuit is made through galvanometer 1, variable resistor 6, bulb, 4 and source 3. In this case the electric resistance of photoconductive cell 2 is enough larger than that of variable resistor 6, so that the indicator of galvanometer 1 deflects according to the resistance value of the variable resistor.

In the practical operation of the device, the resistance value of the variable resistor 6 varies in accordance with the focussing of the objective, so that a certain resistance value is obtained for a certain camera distance and, consequently, the proper exposure value according to the camera distance can be obtained in reference to the graduation of the exposure value for flash photography on the galvanometer.

In the embodiment of FIG. 1, energization of the flash bulb is caused when the electric circuit bulb 4, contact 5 and source 3 is closed by contact 5 cooperating with the shutter release button. On the other hand, in the embodiment shown in FIG. 2, there is also provided another electric source 8 for the flash bulb in addition to source 3, and energization of the flash bulb is caused when the circuit through bulb 4, contact 5 and source 8 is closed by contact 5 cooperating with the shutter release button; wherein source 8 is provided solely for the energization of the bulb so that the electric capacity will be large enough to obtain a sure and precise flash illumination.

It will be understood that this invention is not limited to the specific materials, figures, etc., and other details described above and illustrated in the drawing, but can be carried out with various modifications without departing from the scope of the invention, as defined in the appended claims.

What I claim is:
1. A flash circuit for a photographic camera comprising an exposure meter circuit having a galvanometer, a photoconductive cell and an electric source for the exposure meter circuit, in which a series circuit comprising a flash bulb socket and a variable resistor cooperating with camera distance are arranged in parallel with said photoconductive cell.
2. A flash circuit for a photographic camera according to claim 1, in which, an electric source for flashing the flash bulb is inserted in the exposure meter circuit in addition to the source for the exposure meter.

No references cited.

NORTON ANSHER, *Primary Examiner.*
J. F. PETERS, *Assistant Examiner.*